(12) United States Patent
Liu

(10) Patent No.: US 11,553,433 B2
(45) Date of Patent: Jan. 10, 2023

(54) USER EQUIPMENT POWER-SAVING METHOD AND DEVICE, USER EQUIPMENT AND BASE STATION

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 49 days.

(21) Appl. No.: 16/768,812

(22) PCT Filed: Dec. 14, 2017

(86) PCT No.: PCT/CN2017/116150
§ 371 (c)(1),
(2) Date: Jun. 1, 2020

(87) PCT Pub. No.: WO2019/113883
PCT Pub. Date: Jun. 20, 2019

(65) Prior Publication Data
US 2021/0176708 A1 Jun. 10, 2021

(51) Int. Cl.
*H04W 52/02* (2009.01)
*H04W 76/28* (2018.01)
*H04W 76/10* (2018.01)
*H04W 72/04* (2009.01)
*H04W 88/02* (2009.01)

(52) U.S. Cl.
CPC ... *H04W 52/0248* (2013.01); *H04W 52/0235* (2013.01); *H04W 72/042* (2013.01); *H04W 76/10* (2018.02); *H04W 76/28* (2018.02); *H04W 88/02* (2013.01)

(58) Field of Classification Search
None
See application file for complete search history.

(56) References Cited

U.S. PATENT DOCUMENTS

| 8,879,667 B2 | 11/2014 | Chen |
| 9,313,747 B2 | 4/2016 | Zhu |
| 9,497,713 B2 | 11/2016 | Yang |
| 9,504,084 B2 | 11/2016 | Niu |
| 9,642,180 B2 | 5/2017 | Chen |

(Continued)

FOREIGN PATENT DOCUMENTS

| CN | 1980452 A | 6/2007 |
| CN | 101489283 A | 7/2009 |

(Continued)

OTHER PUBLICATIONS

Supplementary European Search Report in the European application No. 17934982.4, dated Jun. 15, 2021.

(Continued)

*Primary Examiner* — James P Duffy
(74) *Attorney, Agent, or Firm* — Syncoda LLC; Feng Ma

(57) ABSTRACT

A user equipment power-saving method includes: determining a second signaling on the basis of a first signaling, wherein the second signaling is a radio resource control (RRC) connection request signaling and carries a signaling element that characterizes a cause value for requesting to establish an RRC connection as a discontinuous reception (DRX) cycle update; and sending the second signaling.

12 Claims, 18 Drawing Sheets

(56) References Cited

U.S. PATENT DOCUMENTS

| | | | |
|---|---|---|---|
| 9,936,495 B2 | 4/2018 | Chen et al. | |
| 2007/0291673 A1* | 12/2007 | Demirhan | H04W 52/0216 370/311 |
| 2008/0232310 A1 | 9/2008 | Xu | |
| 2011/0292852 A1* | 12/2011 | Kone | H04W 52/0261 370/311 |
| 2012/0207069 A1 | 8/2012 | Xu | |
| 2013/0094379 A1* | 4/2013 | Xu | H04W 28/18 370/252 |
| 2013/0265975 A1 | 10/2013 | Shirani-Mehr | |
| 2013/0308564 A1 | 11/2013 | Jain | |
| 2013/0336152 A1 | 12/2013 | Zhu | |
| 2014/0119255 A1* | 5/2014 | Vannithamby | H04W 52/0251 370/311 |
| 2014/0226542 A1 | 8/2014 | Gupta | |
| 2014/0247765 A1 | 9/2014 | Baghel et al. | |
| 2015/0201375 A1 | 7/2015 | Vannithamby et al. | |
| 2016/0073447 A1* | 3/2016 | Rune | H04W 76/28 370/311 |
| 2016/0192435 A1 | 6/2016 | Gupta et al. | |
| 2017/0019948 A1 | 1/2017 | Baghel et al. | |
| 2017/0238288 A1 | 8/2017 | Chen et al. | |
| 2018/0192407 A1 | 7/2018 | Chen et al. | |

FOREIGN PATENT DOCUMENTS

| | | |
|---|---|---|
| CN | 102958099 A | 3/2013 |
| CN | 103945505 A | 7/2014 |
| CN | 105122933 A | 12/2015 |
| CN | 105636239 A | 6/2016 |
| CN | 106792868 A | 5/2017 |
| WO | 2013051865 A2 | 4/2013 |

OTHER PUBLICATIONS

Second Office Action of the Chinese application No. 201780002115.6, dated Nov. 13, 2020.

"3rd Generation Partnership Project; Technical Specification Group Core Network and Terminals; Non-Access-Stratum (NAS) protocol for Evolved Packet System (EPS); Stage 3 (Release 11)" 3GPP TS 24.301 V11.4.0 (Sep. 2012), http://www.3gpp.org.

"3rd Generation Partnership Project; Technical Specification Group Radio Access Network; Evolved Universal Terrestrial Radio Access (E-UTRA); Radio Resource Control (RRC); Protocol specification (Release 11)" 3GPP TS 36.331 V11.1.0 (Sep. 2012), http://www.3gpp.org.

Nokia etc., DRX principles for NR, 3GPP TSG-RAN WG2 Meeting #96 R2-167707, Nov. 18, 2016 (Nov. 18, 2016), p. 1-4.

International Search Report in the international application No. PCT/CN2017/116150, dated Sep. 5, 2018.

English translation of the Written Opinion of the International Search Authority in the international application No. PCT/CN2017/116150, dated Sep. 5, 2018.

First Office Action of the Chinese application No. 201780002115.6, dated Mar. 23, 2020.

Office Action of the Indian application No. 202047029771, dated Nov. 11, 2021.

\* cited by examiner

USER EQUIPMENT POWER-SAVING METHOD AND DEVICE, USER EQUIPMENT AND BASE STATION

CROSS-REFERENCE TO RELATED APPLICATIONS

The present application is a national stage of International Application No. PCT/CN2017/116150 filed on Dec. 14, 2017, the disclosure of which is hereby incorporated by reference in its entirety.

TECHNICAL FIELD

The subject disclosure relates to the field of communication, and more particularly, to a method and device for saving power of User Equipment (UE), UE, and a base station.

BACKGROUND

In a wireless communication system such as a Long-Term Evolution (LTE) system, to improve power saving performance of User Equipment (UE), Discontinuous Reception (DRX) is proposed. UE in a DRX mode may receive downlink data and a downlink scheduling command on a Physical Downlink Control CHannel (PDCCH) discontinuously based on a DRX cycle. When neither downlink scheduling command nor downlink data are to be received, UE may be in a sleep state. A PDCCH may be monitored periodically discontinuously, thereby saving power.

In related art, a system network side may determine a duration of a DRX cycle based on a factor such as paging capacity. UE may be notified of a duration of a DRX cycle. However, a DRX cycle configured by a system network side may not meet a demand of UE, thereby failing to optimize power saving performance.

SUMMARY

In view of this, embodiments herein provide a method and device for saving power of User Equipment (UE), UE, and a base station, capable of configuring a reasonable DRX cycle for UE according to a request initiated by the UE or a service mode of the UE, thereby optimizing power saving performance.

According to a first aspect herein, a method for saving power of User Equipment (UE) may apply to UE. The method includes:

determining second signaling based on first signaling, the second signaling being Radio Resource Control (RRC) connection request signaling, the second signaling including a signaling element, the signaling element being a cause value indicating that a request for establishing an RRC connection is sent for Discontinuous Reception (DRX) cycle update; and sending the second signaling.

According to an embodiment herein, the second signaling may further include information indicating a desired DRX cycle.

The second signaling may include information indicating a desired DRX cycle and an effective term during which an updated DRX cycle is in effect.

According to an embodiment herein, the method may further include: receiving third signaling sent by a base station based on the second signaling.

The third signaling may include an updated DRX cycle.

According to an embodiment herein, the method may further include:

receiving fourth signaling sent by a base station based on the second signaling, the fourth signaling being RRC connection establishment signaling; and sending fifth signaling to the base station, the fifth signaling including information indicating a desired DRX cycle, or the fifth signaling including information indicating a desired DRX cycle and an effective term during which an updated DRX cycle is in effect.

According to an embodiment herein, the method may further include: receiving sixth signaling sent by the base station based on the fifth signaling.

The sixth signaling may include the updated DRX cycle.

According to an embodiment herein, the method may further include: before determining the second signaling based on the first signaling, receiving a trigger of DRX cycle update sent by a user.

According to a second aspect herein, a method for saving power of User Equipment (UE) may apply to UE. The method includes:

monitoring a Physical Downlink Control CHannel (PDCCH); and in response to determining that a result of the monitoring indicates that there is a paging message with a cause value for Discontinuous Reception (DRX) cycle update, receiving, on a Physical Downlink Shared CHannel (PDSCH), a data block including the paging message, the paging message including an updated DRX cycle.

According to a third aspect herein, a method for saving power of User Equipment (UE) may apply to a base station. The method includes:

receiving second signaling sent by UE, the second signaling being Radio Resource Control (RRC) connection request signaling, the second signaling including a signaling element, the signaling element being a cause value indicating that a request for establishing an RRC connection is sent for Discontinuous Reception (DRX) cycle update; and sending response signaling based on the second signaling.

According to an embodiment herein, the second signaling may further include information indicating a desired DRX cycle.

According to an embodiment herein, the second signaling may include information indicating a desired DRX cycle and an effective term during which an updated DRX cycle is in effect.

According to an embodiment herein, the sending the response signaling based on the second signaling may include: sending third signaling.

The third signaling may include an updated DRX cycle.

According to an embodiment herein, the sending the response signaling based on the second signaling may include: sending fourth signaling to the UE.

The fourth signaling may be RRC connection establishment signaling,

According to an embodiment herein, the method may further include:

receiving fifth signaling sent by the UE after the RRC connection is established, the fifth signaling including information indicating a desired DRX cycle, or the fifth signaling including information indicating a desired DRX cycle and an effective term during which an updated DRX cycle is in effect;

updating, based on the fifth signaling, an original DRX cycle of the UE with the updated DRX cycle; and sending sixth signaling to the UE, the sixth signaling including the updated DRX cycle.

According to an embodiment herein, the method may further include:

in response to determining that a time elapse since the DRX cycle update has reached the effective term, restoring an original DRX cycle of the UE; and sending seventh signaling to the UE, the seventh signaling including the original DRX cycle.

According to a fourth aspect herein, a method for saving power of User Equipment (UE) may apply to a base station. The method includes:

in response to determining that an original Discontinuous Reception (DRX) cycle of UE is to be updated, indicating, on a Physical Downlink Control CHannel (PDCCH), that there is a paging message with a cause value for DRX cycle update; and sending, on a Physical Downlink Shared CHannel (PDSCH), a data block including the paging message, the paging message including an updated DRX cycle.

According to an embodiment herein, the method may further include:

determining, based on a timed service reservation for the UE, whether the original DRX cycle of the UE is to be updated.

According to a fifth aspect herein, a device for saving power of User Equipment (UE) may apply to UE. The device includes a first determining module and a first sending module.

The first determining module may be adapted to determining second signaling based on first signaling. The second signaling is Radio Resource Control (RRC) connection request signaling. The second signaling includes a signaling element. The signaling element is a cause value indicating that a request for establishing an RRC connection is sent for Discontinuous Reception (DRX) cycle update.

The first sending module may be adapted to sending the second signaling.

According to an embodiment herein, the second signaling may further include information indicating a desired DRX cycle.

The second signaling may include information indicating a desired DRX cycle and an effective term during which an updated DRX cycle is in effect.

According to an embodiment herein, the device may further include a first receiving module.

The first receiving module may be adapted to receiving third signaling sent by a base station based on the second signaling. The third signaling may include an updated DRX cycle.

According to an embodiment herein, the device may further include a second receiving module and a second sending module.

The second receiving module may be adapted to receiving fourth signaling sent by a base station based on the second signaling. The fourth signaling may be RRC connection establishment signaling.

The second sending module may be adapted to sending fifth signaling to the base station. The fifth signaling may include information indicating a desired DRX cycle. The fifth signaling may include information indicating a desired DRX cycle and an effective term during which an updated DRX cycle is in effect.

According to an embodiment herein, the device may further include a third receiving module.

The third receiving module may be adapted to receiving sixth signaling sent by the base station based on the fifth signaling. The sixth signaling may include the updated DRX cycle.

According to an embodiment herein, the device may further include a trigger module.

The trigger module may be adapted to receiving a trigger of DRX cycle update sent by a user.

According to a sixth aspect herein, a device for saving power of User Equipment (UE) may apply o UE. The device includes a monitoring module and a fourth receiving module.

The monitoring module may be adapted to monitoring a Physical Downlink Control CHannel (PDCCH).

The fourth receiving module may be adapted to, in response to determining that a result of the monitoring indicates that there is a paging message with a cause value for Discontinuous Reception (DRX) cycle update, receiving, on a Physical Downlink Shared CHannel (PDSCH), a data block including the paging message. The paging message includes an updated DRX cycle.

According to a seventh aspect herein, a device for saving power of User Equipment (UE) may apply to a base station. The device includes a fifth receiving module and a third sending module.

The fifth receiving module is adapted to receiving second signaling sent by UE. The second signaling is Radio Resource Control (RRC) connection request signaling. The second signaling includes a signaling element, the signaling element being a cause value indicating that a request for establishing an RRC connection is sent for Discontinuous Reception (DRX) cycle update.

The third sending module is adapted to sending response signaling based on the second signaling.

According to an embodiment herein, the second signaling may further include information indicating a desired DRX cycle.

The second signaling may include information indicating a desired DRX cycle and an effective term during which an updated DRX cycle is in effect.

According to an embodiment herein, the third sending module may include a first sending sub-module.

The first sending sub-module may be adapted to sending third signaling. The third signaling may include an updated DRX cycle.

According to an embodiment herein, the third sending module may include a second sending sub-module.

The second sending sub-module may be adapted to sending fourth signaling to the UE. The fourth signaling may be RRC connection establishment signaling.

The device may further include a sixth receiving module, an updating module, and a fourth sending module.

The sixth receiving module may be adapted to receiving fifth signaling sent by the UE after the RRC connection is established. The fifth signaling may include information indicating a desired DRX cycle. The fifth signaling may include information indicating a desired DRX cycle and an effective term during which an updated DRX cycle is in effect.

The updating module may be adapted to updating, based on the fifth signaling, an original DRX cycle of the UE with the updated DRX cycle.

The fourth sending module may be adapted to sending sixth signaling to the UE. The sixth signaling may include the updated DRX cycle.

According to an embodiment herein, the device may further include a restoring module and a fifth sending module.

The restoring module may be adapted to, in response to determining that a time elapse since the DRX cycle update has reached the effective term, restoring an original DRX cycle of the UE.

The fifth sending module may be adapted to sending seventh signaling to the UE. The seventh signaling may include the original DRX cycle.

According to an eighth aspect herein, a device for saving power of User Equipment (UE) may apply to a base station. The device includes an indicating module and a sixth sending module.

The indicating module may be adapted to, in response to determining that an original Discontinuous Reception (DRX) cycle of UE is to be updated, indicating, on a Physical Downlink Control CHannel (PDCCH), that there is a paging message with a cause value for DRX cycle update.

The sixth sending module may be adapted to sending, on a Physical Downlink Shared CHannel (PDSCH), a data block including the paging message. The paging message includes an updated DRX cycle.

According to an embodiment herein, the device may further include a second determining module.

The second determining module may be adapted to determining, based on a timed service reservation for the UE, whether the original DRX cycle of the UE is to be updated.

According to a ninth aspect herein, User Equipment (UE) includes a processor and memory.

The memory is adapted to storing an instruction executable by the processor.

The processor is adapted to:

determining second signaling based on first signaling, the second signaling being Radio Resource Control (RRC) connection request signaling, the second signaling including a signaling element, the signaling element being a cause value indicating that a request for establishing an RRC connection is sent for Discontinuous Reception (DRX) cycle update; and sending the second signaling.

According to a tenth aspect herein, User Equipment (UE) includes a processor and memory.

The memory is adapted to storing an instruction executable by the processor.

The processor is adapted to:

monitoring a Physical Downlink Control CHannel (PDCCH); and in response to determining that a result of the monitoring indicates that there is a paging message with a cause value for Discontinuous Reception (DRX) cycle update, receiving, on a Physical Downlink Shared CHannel (PDSCH), a data block including the paging message, the paging message including an updated DRX cycle.

According to an eleventh aspect herein, a base station includes a processor and memory.

The memory is adapted to storing an instruction executable by the processor.

The processor is adapted to:

receiving second signaling sent by UE, the second signaling being Radio Resource Control (RRC) connection request signaling, the second signaling including a signaling element, the signaling element being a cause value indicating that a request for establishing an RRC connection is sent for Discontinuous Reception (DRX) cycle update; and sending response signaling based on the second signaling.

According to a twelfth aspect herein, a base station includes a processor and memory.

The memory is adapted to storing an instruction executable by the processor.

The processor is adapted to:

in response to determining that an original Discontinuous Reception (DRX) cycle of UE is to be updated, indicating, on a Physical Downlink Control CHannel (PDCCH), that there is a paging message with a cause value for DRX cycle update; and sending, on a Physical Downlink Shared CHannel (PDSCH), a data block including the paging message, the paging message including an updated DRX cycle.

According to a thirteenth aspect herein, a non-transitory computer-readable storage medium has stored thereon instructions that, when executed by a processor, cause the processor to implement:

determining second signaling based on first signaling, the second signaling being Radio Resource Control (RRC) connection request signaling, the second signaling including a signaling element, the signaling element being a cause value indicating that a request for establishing an RRC connection is sent for Discontinuous Reception (DRX) cycle update; and sending the second signaling.

According to a fourteenth aspect herein, a non-transitory computer-readable storage medium has stored thereon instructions that, when executed by a processor, cause the processor to implement:

monitoring a Physical Downlink Control CHannel (PDCCH); and in response to determining that a result of the monitoring indicates that there is a paging message with a cause value for Discontinuous Reception (DRX) cycle update, receiving, on a Physical Downlink Shared CHannel (PDSCH), a data block including the paging message, the paging message including an updated DRX cycle.

According to a fifteenth aspect herein, a non-transitory computer-readable storage medium has stored thereon instructions that, when executed by a processor, cause the processor to implement:

receiving second signaling sent by UE, the second signaling being Radio Resource Control (RRC) connection request signaling, the second signaling including a signaling element, the signaling element being a cause value indicating that a request for establishing an RRC connection is sent for Discontinuous Reception (DRX) cycle update; and sending response signaling based on the second signaling.

According to a sixteenth aspect herein, a non-transitory computer-readable storage medium has stored thereon instructions that, when executed by a processor, cause the processor to implement:

in response to determining that an original Discontinuous Reception (DRX) cycle of UE is to be updated, indicating, on a Physical Downlink Control CHannel (PDCCH), that there is a paging message with a cause value for DRX cycle update; and sending, on a Physical Downlink Shared CHannel (PDSCH), a data block including the paging message, the paging message including an updated DRX cycle.

The technical solution provided by embodiments herein includes beneficial effects as follows.

UE may request a base station to change a DRX cycle through RRC connection request signaling. Accordingly, the base station may configure a reasonable DRX cycle for the UE based on the request of the UE, thereby optimizing power saving performance. In addition, a base station may take the initiative to update a DRX cycle of UE through a paging message and new paging Downlink Control Information (DCI) based on a timed reservation for the UE.

Accordingly, the base station may configure a reasonable DRX cycle for the UE, thereby optimizing power saving performance.

The above general description and detailed description below are but exemplary and explanatory, and do not limit the subject disclosure.

BRIEF DESCRIPTION OF THE ACCOMPANYING DRAWINGS

Drawings here are incorporated in and constitute part of the subject disclosure, illustrate embodiments according to the subject disclosure, and together with the subject disclosure, serve to explain the principle of the subject disclosure.

DETAILED DESCRIPTION

Figure 1A:
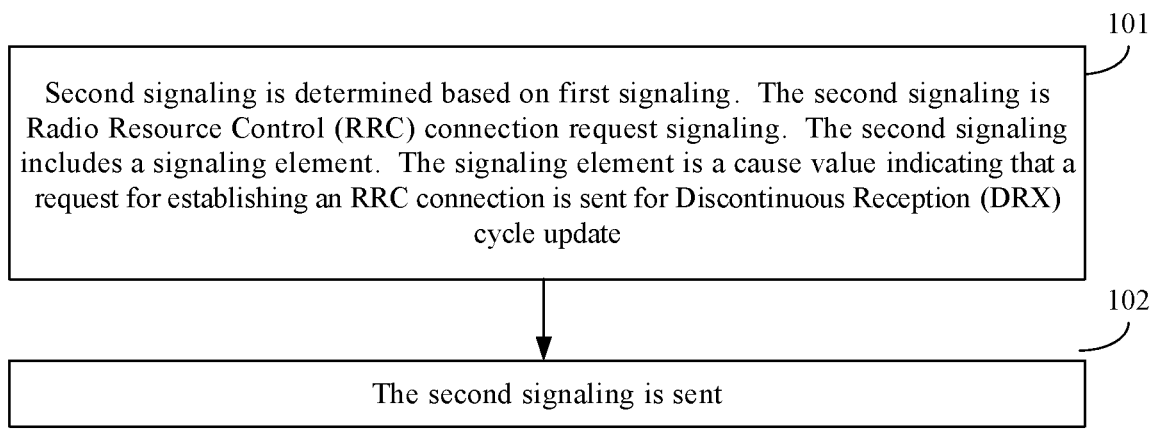
FIG. 1A is a flowchart of a method for saving power of UE according to an exemplary embodiment.

Exemplary embodiments (examples of which are illustrated in the accompanying drawings) are elaborated below. The following description refers to the accompanying drawings, in which identical or similar elements in two drawings are denoted by identical reference numerals unless indicated otherwise. Implementations set forth in the following exemplary embodiments do not recurrent all implementations in accordance with the subject disclosure. Rather, they are mere examples of the device and method in accordance with certain aspects of the subject disclosure as recited in the accompanying claims.

Figure 1B:
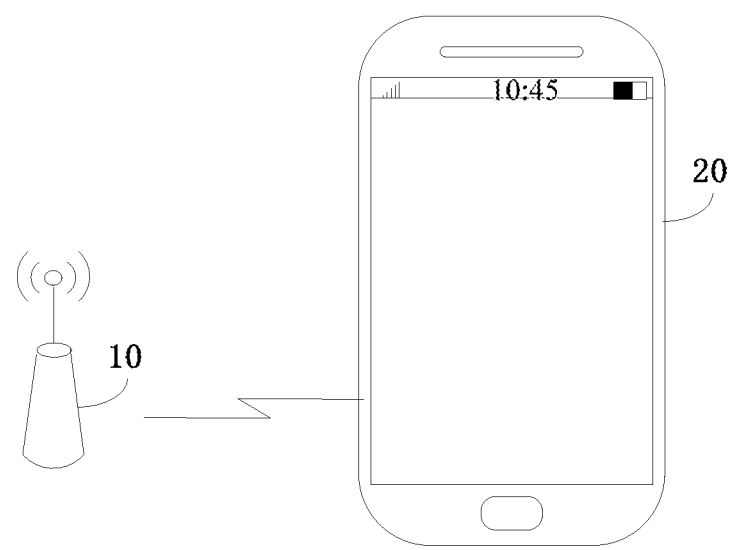
FIG. 1B is a diagram of a scene of a method for saving power of UE according to an exemplary embodiment.

FIG. 1A is a flowchart of a method for saving power of UE according to an exemplary embodiment. FIG. 1B is a diagram of a scene of a method for saving power of UE according to an exemplary embodiment. The method for saving power of UE may apply to UE in an idle state or a deactivated state. As shown in FIG. 1A, the method for saving power of UE includes steps 101-102 as follows.

In step 101, second signaling is determined based on first signaling. The second signaling is Radio Resource Control (RRC) connection request signaling. The second signaling includes a signaling element. The signaling element is a cause value indicating that a request for establishing an RRC connection is sent for Discontinuous Reception (DRX) cycle update.

According to an embodiment herein, first signaling may be RRC connection request signaling. When a signaling connection is to be established, UE in an idle state or a deactivated state may send first signaling, thereby establishing an RRC connection. However, herein a cause value of initiating an RRC connection may be DRX cycle update. Accordingly, second signaling may be acquired by including, in first signaling, a signaling element which is a cause value indicating that a request for establishing an RRC connection is sent for DRX cycle update.

In step 102, the second signaling is sent.

According to an embodiment herein, UE may receive a trigger of DRX cycle update sent by a user through an interface for setting a power saving mode. Then, the UE may determine second signaling. The UE may send the second signaling.

According to an embodiment herein, UE may determine and send second signaling based on how the UE is being used, such as when the UE has no service data to be transmitted, and no operation on the UE has been performed in two hours since 10 pm.

According to an embodiment herein, UE may send second signaling in a mode same as how UE in an idle state or a deactivated state sends RRC connection request signaling in related art, which is not elaborated herein.

Refer to FIG. 1B for an exemplary embodiment herein. A scene shown in FIG. 1B may include a base station 10 and UE 20 such as a smart phone, a tablet computer, etc. UE 20 in an activated state or a non-idle state may send, to the base station 10, RRC connection request signaling including a signaling element. The signaling element is a cause value indicating that a request for establishing an RRC connection is sent for DRX cycle update. Accordingly, the base station 10 may determine that the UE 20 wishes for a DRX cycle update. Therefore, the base station 10 may update an original DRX cycle of the UE based on the request of the UE, thereby optimizing power saving performance.

With embodiments herein, through step 101 to step 102, UE may request a base station to change a DRX cycle through RRC connection request signaling. Accordingly, the base station may configure a reasonable DRX cycle for the UE based on the request of the UE, thereby optimizing power saving performance.

Please refer to an embodiment as follows for implementing power saving on UE.

Figure 2:
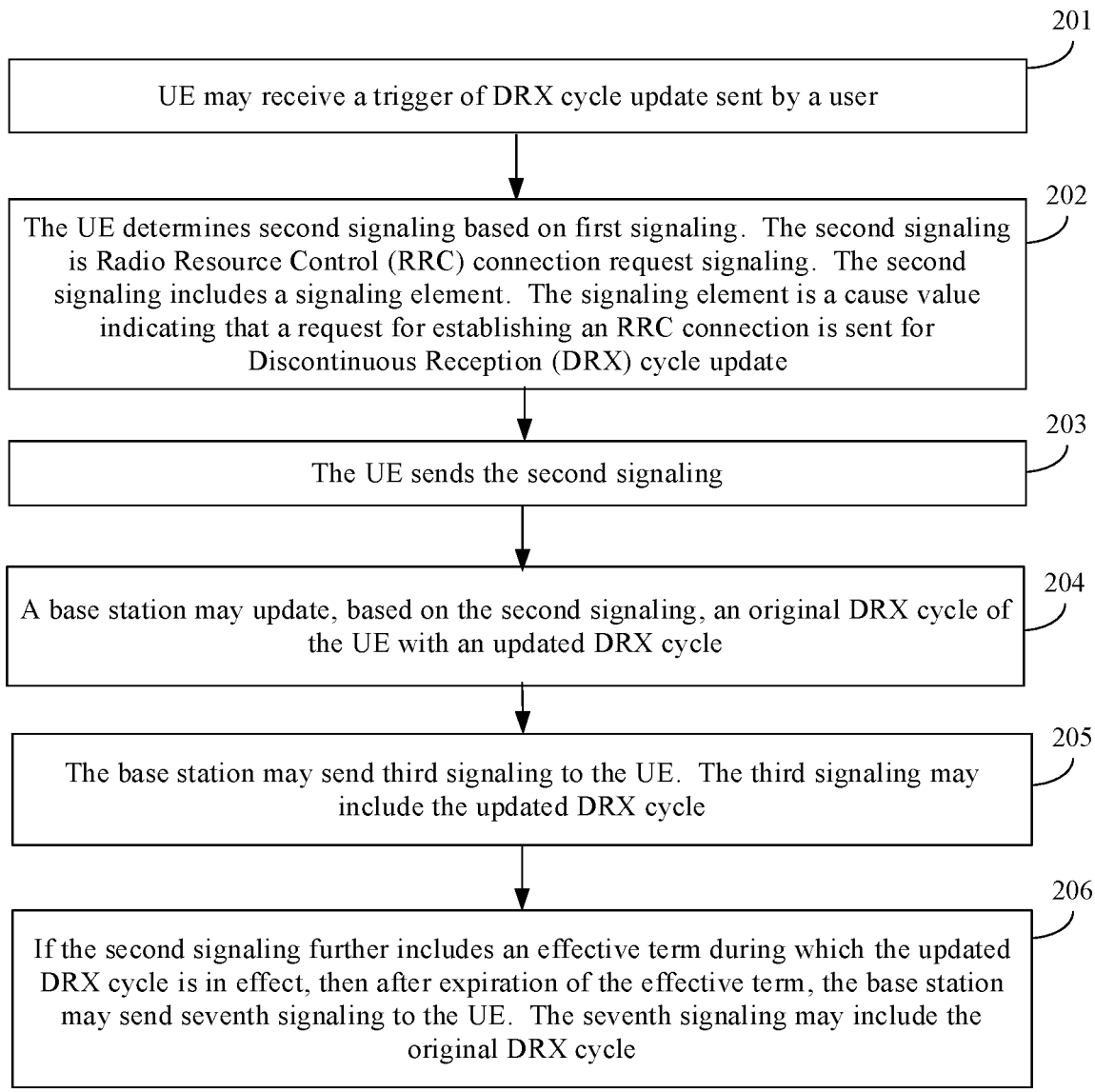
FIG. 2 is a flowchart of a method for saving power of UE according to an exemplary embodiment.

FIG. 2 is a flowchart of a method for saving power of UE according to an exemplary embodiment. According to an embodiment herein, an example is illustrated where UE may interact with a base station using a method according to an embodiment herein. UE may include, in RRC connection request signaling, information indicating a desired DRX cycle, thereby implementing DRX cycle update. As shown in FIG. 2, the method may include a step as follows.

In step 201, UE may receive a trigger of DRX cycle update sent by a user.

According to an embodiment herein, an interface for setting a power saving mode adapted to operating the UE may be set in the UE. UE may trigger DRX cycle update through the interface. According to an embodiment herein, a user may also trigger DRX cycle update in another mode.

In step 202, the UE determines second signaling based on first signaling. The second signaling is Radio Resource Control (RRC) connection request signaling. The second signaling includes a signaling element. The signaling element is a cause value indicating that a request for establishing an RRC connection is sent for Discontinuous Reception (DRX) cycle update.

According to an embodiment herein, the second signaling may further include information indicating a desired DRX cycle. According to an embodiment herein, information indicating a desired DRX cycle may be amplitude of change. For example, amplitude of change may be 512 ms. That is, it is indicated that a base station is to increase the original DRX cycle by 512 ms. According to an embodiment herein, information indicating a desired DRX cycle may be a desired DRX cycle. For example, a desired DRX cycle may be 1,024 ms. That is, it is indicated that a base station is to update a DRX cycle to be 1,024 ms.

According to an embodiment herein, multiple candidate DRX cycles may also be preconfigured in a system. For example, eight DRX cycles may be preconfigured. Eight distinct DRX cycles may be denoted respectively by 000, 001, 010, 011, 100, 101, 110 and 111. When DRX cycle update is desired, UE may inform a base station of a desired DRX cycle desired by the UE merely by including, in the second signaling, one of the eight numerical values.

According to an embodiment herein, the second signaling may further include an effective term during which an updated DRX cycle is in effect. An effective term during which an updated DRX cycle is in effect may be understood as a duration during which an updated DRX cycle is effective (after an original DRX cycle has been updated with a desired DRX cycle). For example, an effective term may be eight hours. Accordingly, an original DRX cycle may have to be restored eight hours after the DRX cycle update.

In step 203, the UE sends the second signaling.

In step 204, a base station may update, based on the second signaling, an original DRX cycle of the UE with an updated DRX cycle.

According to an embodiment herein, a base station may determine an updated DRX cycle based directly on information indicating a desired DRX cycle included in second signaling. For example, an original DRX cycle may be 64 ms. UE may indicate, in second signaling, to increase the DRX cycle by 512 ms. Accordingly, an updated DRX cycle may be 576 ms. Alternatively, UE may indicate, in second signaling, to update the DRX cycle with 512 ms. Accordingly, an updated DRX cycle may be 512 ms.

According to an embodiment herein, if a base station deems a desired DRX cycle indicated by UE in second signaling to be unreasonable, the base station per se may determine an updated DRX cycle.

In step 205, the base station may send third signaling to the UE. The third signaling may include the updated DRX cycle.

According to an embodiment herein, third signaling may be RRC connection establishment signaling. The RRC connection establishment signaling may include an updated DRX cycle. After an RRC connection is established, the RRC connection may be released. According to an embodiment herein, third signaling may also be other signaling including an updated DRX cycle.

In step 206, if the second signaling further includes an effective term during which the updated DRX cycle is in effect, then after expiration of the effective term, the base station may send seventh signaling to the UE. The seventh signaling may include the original DRX cycle.

According to an embodiment herein, UE may indicate, in second signaling, an effective term during which an updated DRX cycle is in effect. Then, to reduce signaling waste and ensure a DRX cycle of the UE, after the effective term expires, the original DRX cycle of the UE before the update may be restored. The UE may be informed of the original DRX cycle through seventh signaling. Accordingly, the UE may monitor a PDCCH based on the original DRX cycle.

With embodiments herein, UE may include information indicating a desired DRX cycle directly in second signaling. Accordingly, a base station may update a DRX cycle of the UE based on the second signaling. The base station may inform the UE of the updated DRX cycle through third signaling, achieving optimal power saving performance with fairly less signaling exchange, reducing waste of a signaling resource.

Figure 3:
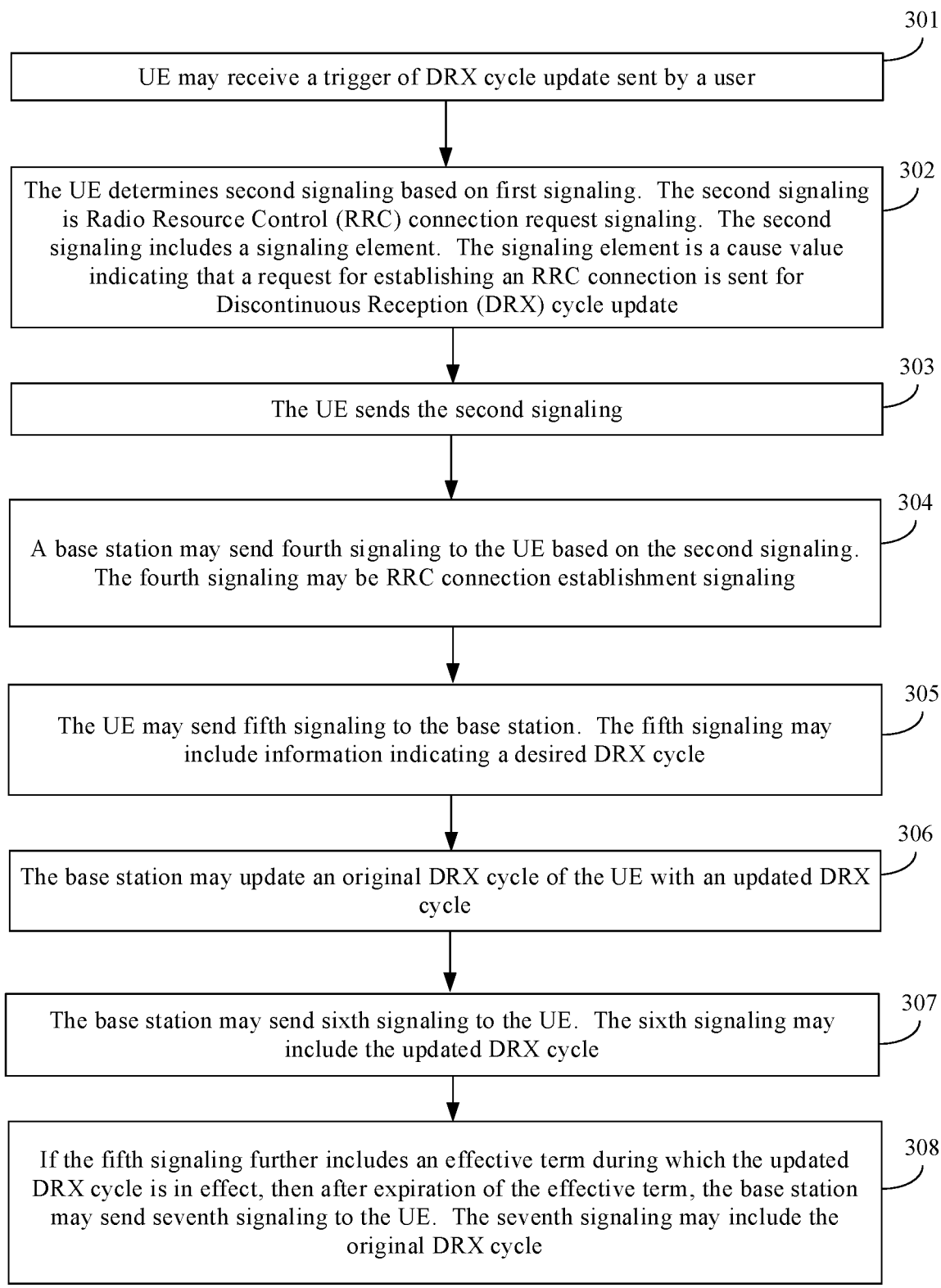
FIG. 3 is a flowchart of a method for saving power of UE according to an exemplary embodiment.

FIG. 3 is a flowchart of a method for saving power of UE according to an exemplary embodiment. According to an embodiment herein, an example is illustrated where UE may interact with a base station using a method according to an embodiment herein, thereby implementing DRX cycle update. As shown in FIG. 3, the method may include a step as follows.

In step 301, UE may receive a trigger of DRX cycle update sent by a user.

In step 302, the UE determines second signaling based on first signaling. The second signaling is Radio Resource Control (RRC) connection request signaling. The second signaling includes a signaling element. The signaling element is a cause value indicating that a request for establishing an RRC connection is sent for Discontinuous Reception (DRX) cycle update.

According to an embodiment herein, RRC connection request signaling may not be suitable for carrying too many signaling elements. Accordingly, only a signaling element including a cause value may be added to original RRC connection request signaling. The cause value may indicate that a request for establishing an RRC connection is sent for DRX cycle update.

In step 303, the UE sends the second signaling.

In step 304, a base station may send fourth signaling to the UE based on the second signaling. The fourth signaling may be RRC connection establishment signaling.

In step 305, the UE may send fifth signaling to the base station. The fifth signaling may include information indicating a desired DRX cycle.

According to an embodiment herein, an RRC connection may be established successfully once UE receives fourth signaling. The UE may send, to a base station, fifth signaling including information indicating a desired DRX cycle.

According to an embodiment herein, fifth signaling may further include an effective term during which an updated DRX cycle is in effect.

In step 306, the base station may update an original DRX cycle of the UE with an updated DRX cycle.

In step 307, the base station may send sixth signaling to the UE. The sixth signaling may include the updated DRX cycle.

In step 308, if the fifth signaling further includes an effective term during which the updated DRX cycle is in effect, then after expiration of the effective term, the base station may send seventh signaling to the UE. The seventh signaling may include the original DRX cycle.

According to an embodiment herein, UE may indicate, in fifth signaling, an effective term during which an updated DRX cycle is in effect. Then, to reduce signaling waste and ensure a DRX cycle of the UE, after the effective term expires, the original DRX cycle of the UE before the update may be restored. The UE may be informed of the original DRX cycle through seventh signaling. Accordingly, the UE may monitor a PDCCH based on the original DRX cycle.

With embodiments herein, first, UE may establish an RRC connection with a base station. Then, a DRX cycle of the UE may be updated by exchanging signaling, avoiding inclusion of too many signaling elements in RRC connection request signaling.

Figure 4:
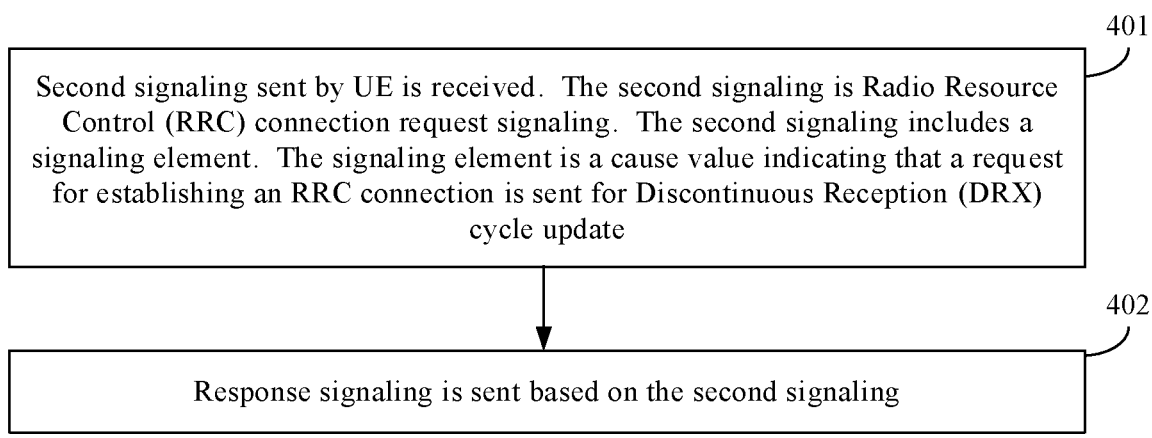
FIG. 4 is a flowchart of a method for saving power of UE according to an exemplary embodiment.

FIG. 4 is a flowchart of a method for saving power of UE according to an exemplary embodiment. The method for saving power of UE may apply to a base station. As shown in FIG. 4, the method for saving power of UE includes steps 401-402 as follows.

In step 401, second signaling sent by UE is received. The second signaling is Radio Resource Control (RRC) connection request signaling. The second signaling includes a signaling element. The signaling element is a cause value indicating that a request for establishing an RRC connection is sent for Discontinuous Reception (DRX) cycle update.

In step 402, response signaling is sent based on the second signaling.

According to an embodiment herein, second signaling may include information indicating a desired DRX cycle. Second signaling may include information indicating a desired DRX cycle and an effective term during which an updated DRX cycle is in effect. Then, response signaling may be third signaling. Third signaling may include an updated DRX cycle. Refer to an embodiment shown in FIG. 2 for a flow of signaling thereof, which is not elaborated here.

According to an embodiment herein, second signaling may include no information indicating a desired DRX cycle. Then, response signaling may be fourth signaling. Fourth signaling may be RRC connection establishment signaling. Accordingly, an RRC connection for UE may be established. After an RRC connection is established, UE may send fifth signaling. A base station may receive the fifth signaling. The fifth signaling may include information indicating a desired DRX cycle. The fifth signaling may include information indicating a desired DRX cycle and an effective term during which an updated DRX cycle is in effect. A base station may update an original DRX cycle of UE with an updated DRX cycle based on fifth signaling. The base station may send sixth signaling to the UE. The sixth signaling may include the updated DRX cycle. Refer to an embodiment shown in FIG. 3 for a flow of signaling thereof, which is not elaborated here.

Refer to FIG. 1B for an exemplary embodiment herein. A scene shown in FIG. 1B may include a base station 10 and UE 20 such as a smart phone, a tablet computer, etc. UE 20 in an activated state or a non-idle state may send, to the base station 10, RRC connection request signaling including a signaling element. The signaling element is a cause value indicating that a request for establishing an RRC connection is sent for DRX cycle update. Accordingly, the base station 10 may determine that the UE 20 wishes for a DRX cycle update. Therefore, the base station 10 may update an original DRX cycle of the UE based on the request of the UE, thereby optimizing power saving performance.

With embodiments herein, through step 401 to step 402, a base station may change a DRX cycle of UE based on a request of the UE. Accordingly, the base station may configure a reasonable DRX cycle for the UE, thereby optimizing power saving performance.

Please refer to an embodiment as follows for implementing power saving on UE.

Figure 5:
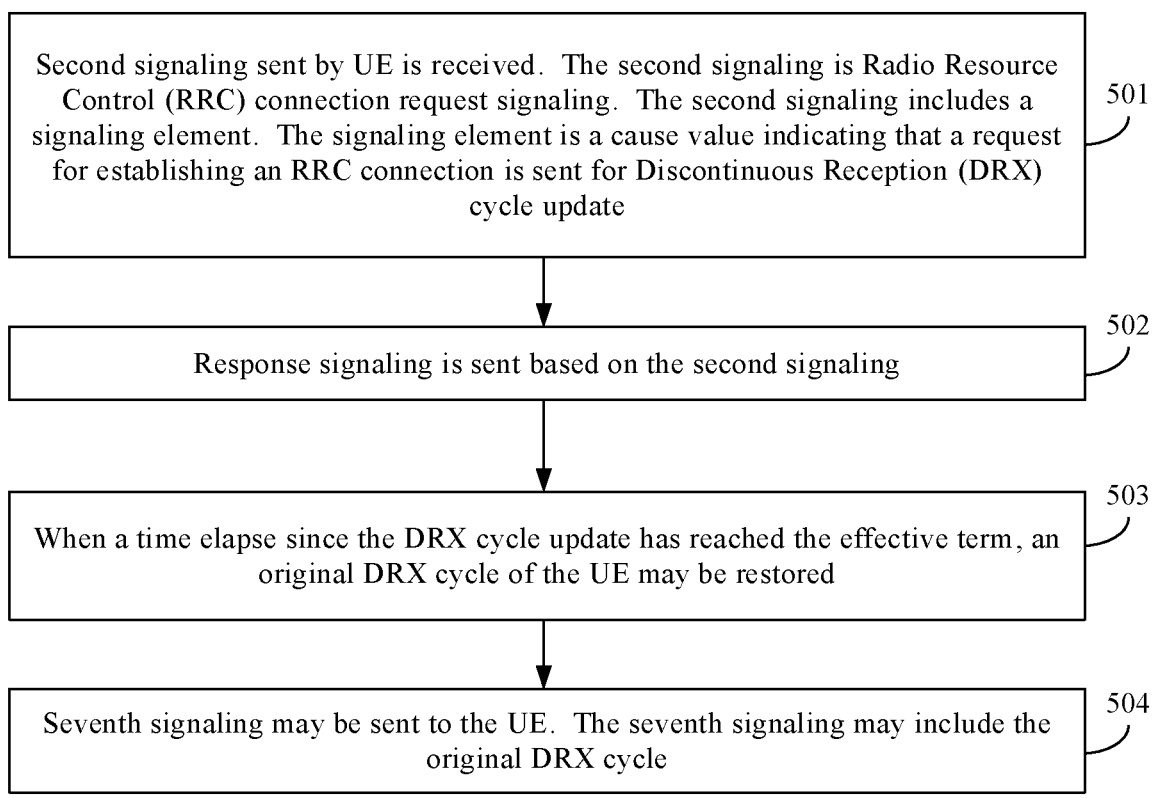
FIG. 5 is a flowchart of a method for saving power of UE according to an exemplary embodiment.

FIG. 5 is a flowchart of a method for saving power of UE according to an exemplary embodiment. According to an embodiment herein, an example is illustrated where a base station may update an original DRX cycle of UE based on a request of the UE using a method according to an embodiment herein. As shown in FIG. 5, the method may include a step as follows.

In step 501, second signaling sent by UE is received. The second signaling is Radio Resource Control (RRC) connection request signaling. The second signaling includes a signaling element. The signaling element is a cause value indicating that a request for establishing an RRC connection is sent for Discontinuous Reception (DRX) cycle update.

In step 502, response signaling is sent based on the second signaling.

According to an embodiment herein, refer to description of step 402 according to an embodiment shown in FIG. 4 for description of step 502, which is not elaborated here.

According to an embodiment herein, second signaling may include information indicating a desired DRX cycle. Second signaling may include information indicating a desired DRX cycle and an effective term during which an updated DRX cycle is in effect. Then, response signaling may be third signaling. Third signaling may include an updated DRX cycle. Refer to an embodiment shown in FIG. 2 for a flow of signaling thereof, which is not elaborated here.

According to an embodiment herein, second signaling may include no information indicating a desired DRX cycle. Then, response signaling may be fourth signaling. Fourth signaling may be RRC connection establishment signaling. Accordingly, an RRC connection for UE may be established. After an RRC connection is established, UE may send fifth signaling. A base station may receive the fifth signaling. The fifth signaling may include information indicating a desired DRX cycle. The fifth signaling may include information indicating a desired DRX cycle and an effective term during which an updated DRX cycle is in effect. A base station may update an original DRX cycle of UE with an updated DRX cycle based on fifth signaling. The base station may send sixth signaling to the UE. The sixth signaling may include the updated DRX cycle. Refer to an embodiment shown in FIG. 3 for a flow of signaling thereof, which is not elaborated here.

In step 503, when a time elapse since the DRX cycle update has reached the effective term, an original DRX cycle of the UE may be restored.

In step 504, seventh signaling may be sent to the UE. The seventh signaling may include the original DRX cycle.

According to an embodiment herein, UE may indicate, in second signaling or fifth signaling, an effective term during which an updated DRX cycle is in effect. Then, to reduce signaling waste and ensure a DRX cycle of the UE, after the effective term expires, the original DRX cycle of the UE before the update may be restored. The UE may be informed of the original DRX cycle through seventh signaling. Accordingly, the UE may monitor a PDCCH based on the original DRX cycle.

With embodiments herein, a base station may change a DRX cycle of UE based on a request of the UE. Accordingly, the base station may configure a reasonable DRX cycle for the UE, thereby optimizing power saving performance.

Figure 6A:
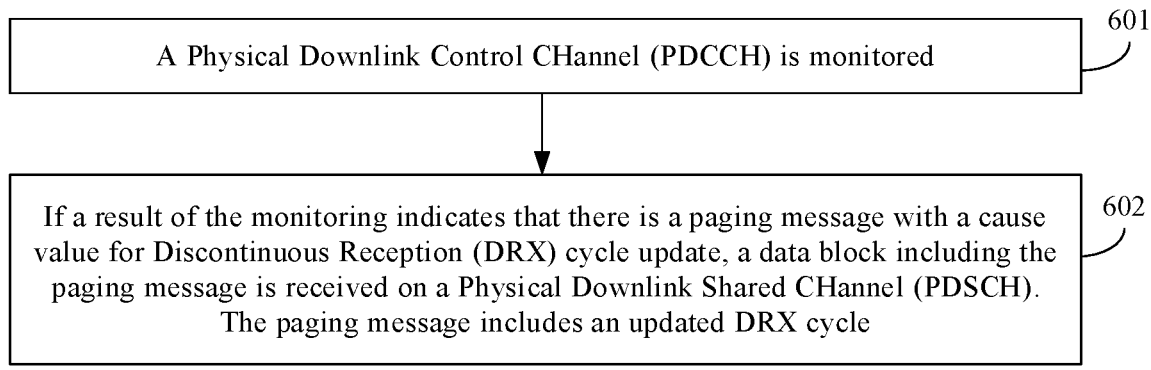
FIG. 6A is a flowchart of a method for saving power of UE according to an exemplary embodiment.
Figure 6B:
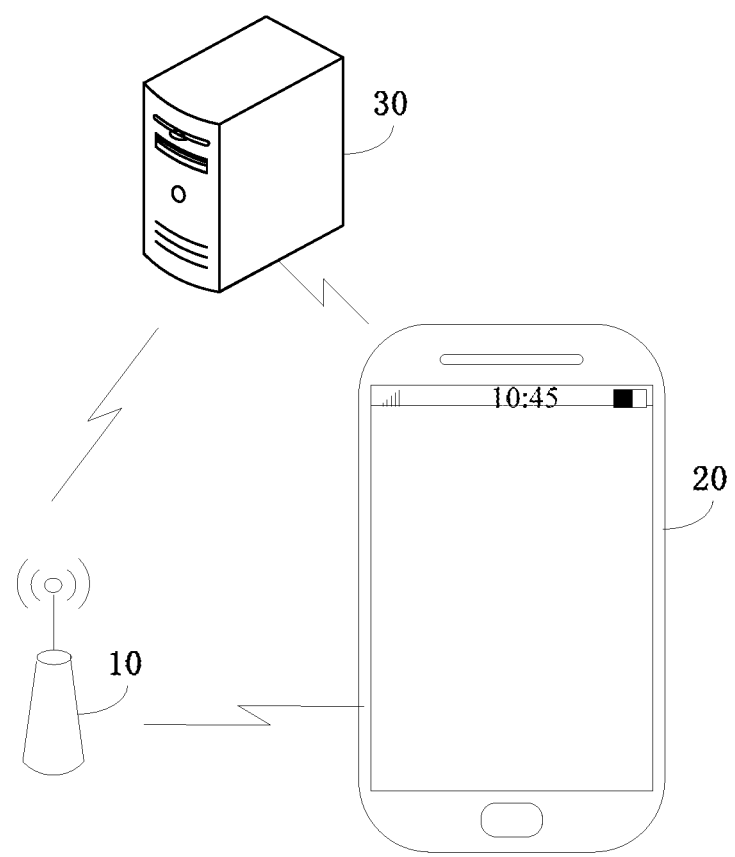
FIG. 6B is a diagram of a scene of a method for saving power of UE according to an exemplary embodiment.

FIG. 6A is a flowchart of a method for saving power of UE according to an exemplary embodiment. FIG. 6B is a diagram of a scene of a method for saving power of UE according to an exemplary embodiment. The method for saving power of UE may apply to UE in an idle state or a deactivated state. As shown in FIG. 6A, the method for saving power of UE includes steps 601-602 as follows.

In step 601, a Physical Downlink Control CHannel (PDCCH) is monitored.

In step 602, if a result of the monitoring indicates that there is a paging message with a cause value for Discontinuous Reception (DRX) cycle update, a data block including the paging message is received on a Physical Downlink Shared CHannel (PDSCH). The paging message includes an updated DRX cycle.

According to an embodiment herein, based on configuration of an APP operator (where for example a server of an operator of a bike sharing service may configure a service time of bike sharing, where the bike sharing service stops 10 pm to 6 am), a base station may send information to UE on a PDCCH at 10 pm. The information may indicate that there is a paging message with a cause value for DRX cycle update. Accordingly, UE may receive a data block including the paging message on a PDSCH. The UE may parse the data block to acquire an updated DRX cycle.

Refer to FIG. 6B for an exemplary embodiment herein. A scene shown in FIG. 6B may include a base station 10, UE 20 (such as a smart phone, a tablet computer, etc.), an APP server 30. The APP server 30 may be provided with a timed service reservation. The APP server may instruct the base station 10 to trigger, at set time, update of an original DRX cycle of the UE 20 installed with an APP. Therefore, the base station 10 may update an original DRX cycle of the UE based on the request of the UE, thereby optimizing power saving performance of the UE.

With embodiments herein, UE may determine that a base station triggers DRX cycle update through a PDCCH. The UE may acquire an updated DRX cycle in a paging message. The UE may monitor the PDCCH based on the updated DRX cycle.

Figure 7:
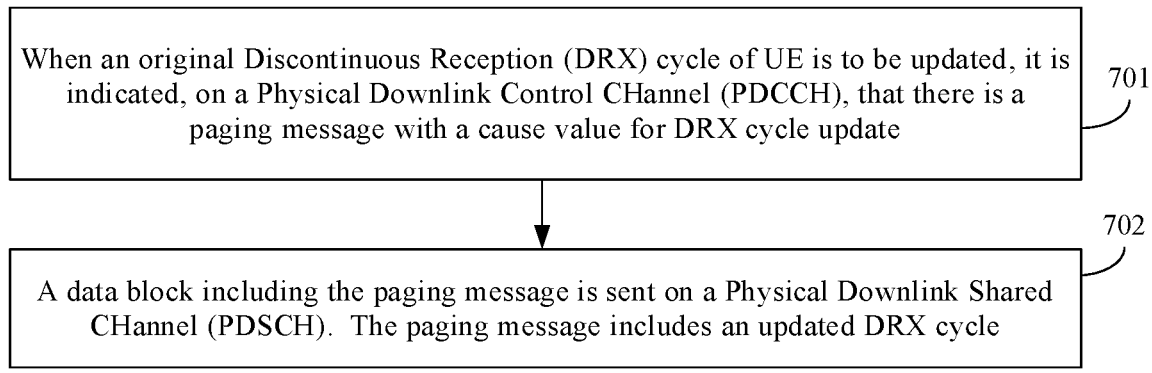
FIG. 7 is a flowchart of a method for saving power of UE according to an exemplary embodiment.

FIG. 7 is a flowchart of a method for saving power of UE according to an exemplary embodiment. The method for saving power of UE may apply to a base station. As shown in FIG. 7, the method for saving power of UE includes steps 701-702 as follows.

In step 701, when an original Discontinuous Reception (DRX) cycle of UE is to be updated, it is indicated on a Physical Downlink Control CHannel (PDCCH) that there is a paging message with a cause value for DRX cycle update.

In step 702, a data block including the paging message is sent on a Physical Downlink Shared CHannel (PDSCH). The paging message includes an updated DRX cycle.

According to an embodiment herein, a base station may determine, based on a timed service reservation for the UE, whether the original DRX cycle of the UE is to be updated. For example, based on configuration of an APP operator (where for example a server of an operator of a bike sharing service may configure a service time of bike sharing, where the bike sharing service stops 10 pm to 6 am), a base station may send information to UE on a PDCCH at 10 pm. The information may indicate that there is a paging message with a cause value for DRX cycle update. Accordingly, UE may receive a data block including the paging message on a PDSCH. The UE may parse the data block to acquire an updated DRX cycle.

With embodiments herein, when an original DRX cycle of UE is to be updated, a base station may inform, on a PDCCH, the UE of that there is a paging message with a cause value for DRX cycle update. Accordingly, the UE may receive the paging message on a time-frequency resource corresponding to a PDSCH. The UE may acquire an updated DRX cycle in the paging message.

Figure 8:
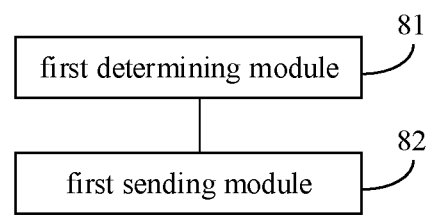
FIG. 8 is a block diagram of a device for saving power of UE according to an exemplary embodiment.

FIG. 8 is a block diagram of a device for saving power of UE according to an exemplary embodiment. The device may apply to UE. The device includes a first determining module and a first sending module.

The first determining module 81 is adapted to determining second signaling based on first signaling. The second signaling is Radio Resource Control (RRC) connection request signaling. The second signaling includes a signaling element. The signaling element is a cause value indicating that a request for establishing an RRC connection is sent for Discontinuous Reception (DRX) cycle update.

The first sending module 82 is adapted to sending the second signaling.

With embodiments herein, UE may request a base station to change a DRX cycle through RRC connection request signaling. Accordingly, the base station may configure a reasonable DRX cycle for the UE based on the request of the UE, thereby optimizing power saving performance.

Figure 9:
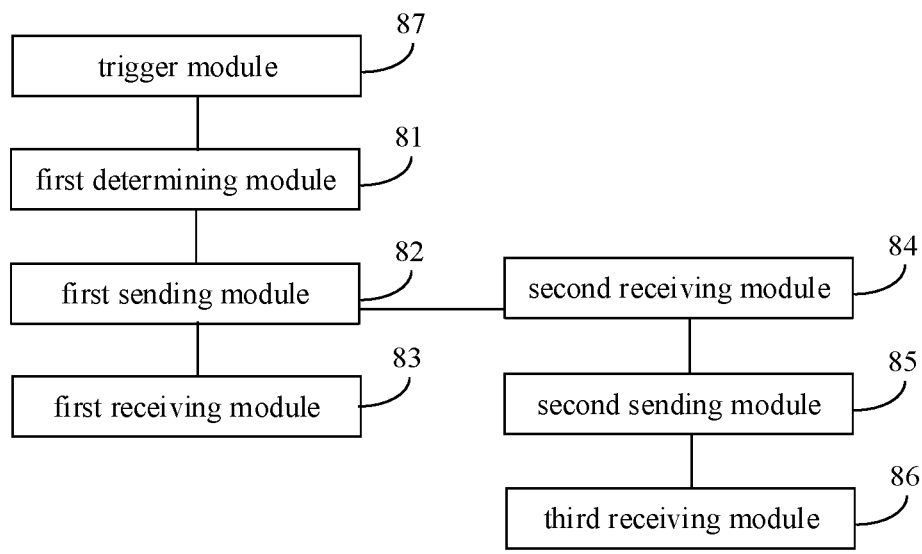
FIG. 9 is a block diagram of a device for saving power of UE according to an exemplary embodiment.

FIG. 9 is a block diagram of a device for saving power of UE according to an exemplary embodiment. As shown in FIG. 9, based on the embodiment shown in FIG. 8, according to an embodiment herein, the second signaling may include information indicating a desired DRX cycle.

The second signaling may include information indicating a desired DRX cycle and an effective term during which an updated DRX cycle is in effect.

According to an embodiment herein, the device may further include a first receiving module.

The first receiving module 83 may be adapted to receiving third signaling sent by a base station based on the second signaling. The third signaling may include an updated DRX cycle.

With embodiments herein, UE may include information indicating a desired DRX cycle directly in second signaling. Accordingly, a base station may update a DRX cycle of the UE based on the second signaling. The base station may inform the UE of the updated DRX cycle through third signaling, achieving optimal power saving performance with fairly less signaling exchange, reducing waste of a signaling resource.

According to an embodiment herein, the device may further include a second receiving module and a second sending module.

The second receiving module 84 may be adapted to receiving fourth signaling sent by a base station based on the second signaling. The fourth signaling may be RRC connection establishment signaling.

The second sending module 85 may be adapted to sending fifth signaling to the base station. The fifth signaling may include information indicating a desired DRX cycle. The fifth signaling may include information indicating a desired DRX cycle and an effective term during which an updated DRX cycle is in effect.

According to an embodiment herein, the device may further include a third receiving module.

The third receiving module 86 may be adapted to receiving sixth signaling sent by the base station based on the fifth signaling. The sixth signaling may include the updated DRX cycle.

With embodiments herein, first, UE may establish an RRC connection with a base station. Then, a DRX cycle of the UE may be updated by exchanging signaling, avoiding inclusion of too many signaling elements in RRC connection request signaling.

According to an embodiment herein, the device may further include a trigger module.

The trigger module 87 may be adapted to receiving a trigger of DRX cycle update sent by a user.

With embodiments herein, for UE may receive a trigger for DRX cycle update.

Figure 10:
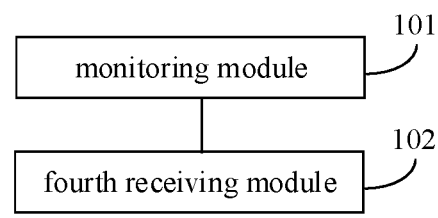
FIG. 10 is a block diagram of a device for saving power of UE according to an exemplary embodiment.

FIG. 10 is a block diagram of a device for saving power of UE according to an exemplary embodiment. The device for saving power of UE may apply to UE. As shown in FIG. 10, the device includes a monitoring module and a fourth receiving module.

The monitoring module 101 is adapted to monitoring a Physical Downlink Control CHannel (PDCCH).

The fourth receiving module 102 is adapted to, in response to determining that a result of the monitoring indicates that there is a paging message with a cause value for Discontinuous Reception (DRX) cycle update, receiving, on a Physical Downlink Shared CHannel (PDSCH), a data block including the paging message. The paging message includes an updated DRX cycle.

With embodiments herein, UE may determine that a base station triggers DRX cycle update through a PDCCH. The UE may acquire an updated DRX cycle in a paging message. The UE may monitor the PDCCH based on the updated DRX cycle.

Figure 11:
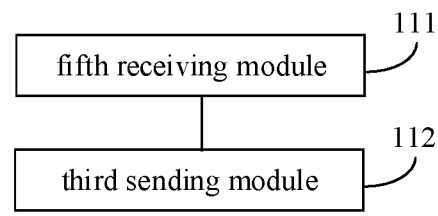
FIG. 11 is a block diagram of a device for saving power of UE according to an exemplary embodiment.

FIG. 11 is a block diagram of a device for saving power of UE according to an exemplary embodiment. The device for saving power of UE may apply to a base station. As shown in FIG. 11, the device includes a fifth receiving module and a third sending module.

The fifth receiving module 111 is adapted to receiving second signaling sent by UE. The second signaling is Radio Resource Control (RRC) connection request signaling. The second signaling includes a signaling element. The signaling element is a cause value indicating that a request for establishing an RRC connection is sent for Discontinuous Reception (DRX) cycle update.

The third sending module 112 is adapted to sending response signaling based on the second signaling.

With embodiments herein, a base station may change a DRX cycle of UE based on a request of the UE. Accordingly, the base station may configure a reasonable DRX cycle for the UE, thereby optimizing power saving performance.

Figure 12:
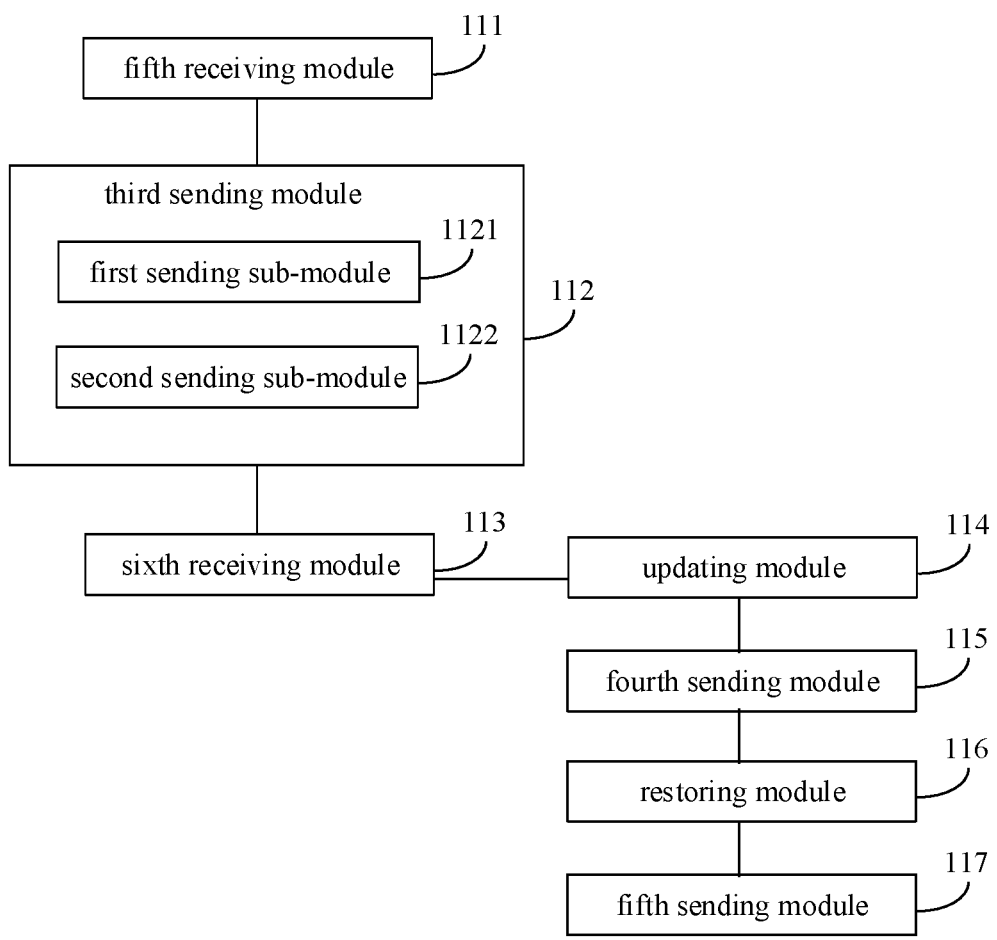
FIG. 12 is a block diagram of a device for saving power of UE according to an exemplary embodiment.

FIG. 12 is a block diagram of a device for saving power of UE according to an exemplary embodiment. As shown in FIG. 12, based on the embodiment shown in FIG. 11, according to an embodiment herein, the second signaling may include information indicating a desired DRX cycle.

The second signaling may include information indicating a desired DRX cycle and an effective term during which an updated DRX cycle is in effect.

According to an embodiment herein, the third sending module 112 may include a first sending sub-module.

The first sending sub-module 1121 may be adapted to sending third signaling. The third signaling may include an updated DRX cycle.

With embodiments herein, UE may include information indicating a desired DRX cycle in second signaling. Accordingly, a base station may update a DRX cycle of the UE based on the second signaling. The base station may inform the UE of the updated DRX cycle through third signaling, achieving optimal power saving performance with fairly less signaling exchange, reducing waste of a signaling resource.

According to an embodiment herein, the third sending module 112 may include a second sending sub-module.

The second sending sub-module 1122 may be adapted to sending fourth signaling to the UE. The fourth signaling may be RRC connection establishment signaling.

The device may further include a sixth receiving module, an updating module, and a fourth sending module.

The sixth receiving module 113 may be adapted to receiving fifth signaling sent by the UE after the RRC connection is established. The fifth signaling may include information indicating a desired DRX cycle. The fifth signaling may include information indicating a desired DRX cycle and an effective term during which an updated DRX cycle is in effect.

The updating module 114 may be adapted to updating, based on the fifth signaling, an original DRX cycle of the UE with the updated DRX cycle.

The fourth sending module 115 may be adapted to sending sixth signaling to the UE. The sixth signaling may include the updated DRX cycle.

With embodiments herein, if UE includes no information indicating a desired DRX cycle in second signaling, a base station may allow the UE to access the base station first. That is, the UE may be allowed to establish an RRC connection with the base station. Then, a DRX cycle of the UE may be updated by exchanging signaling, avoiding inclusion of too many signaling elements in RRC connection request signaling.

According to an embodiment herein, the device may further include a restoring module and a fifth sending module.

The restoring module 116 may be adapted to, in response to determining that a time elapse since the DRX cycle update has reached the effective term, restoring an original DRX cycle of the UE.

The fifth sending module 117 may be adapted to sending seventh signaling to the UE. The seventh signaling may include the original DRX cycle.

With embodiments herein, upon expiration of an effective term, a base station may take the initiative to restore an original DRX cycle of UE before an update. The base station may inform the UE of the restored original DRX cycle through seventh signaling. Accordingly, the UE may monitor a PDCCH based on the original DRX cycle.

Figure 13:
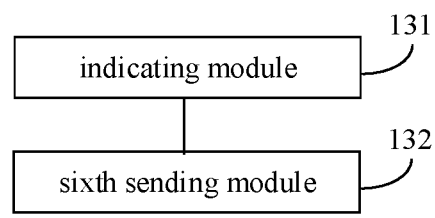
FIG. 13 is a block diagram of a device for saving power of UE according to an exemplary embodiment.

FIG. 13 is a block diagram of a device for saving power of UE according to an exemplary embodiment. The device for saving power of UE may apply to a base station. As shown in FIG. 13, the device may include an indicating module and a sixth sending module.

The indicating module 131 is adapted to, in response to determining that an original Discontinuous Reception (DRX) cycle of UE is to be updated, indicating, on a Physical Downlink Control CHannel (PDCCH), that there is a paging message with a cause value for DRX cycle update.

The sixth sending module 132 is adapted to sending, on a Physical Downlink Shared CHannel (PDSCH), a data block including the paging message. The paging message includes an updated DRX cycle.

With embodiments herein, when an original DRX cycle of UE is to be updated, a base station may inform, on a PDCCH, the UE of that there is a paging message with a cause value for DRX cycle update. Accordingly, the UE may receive the paging message on a time-frequency resource corresponding to a PDSCH. The UE may acquire an updated DRX cycle in the paging message.

Figure 14:
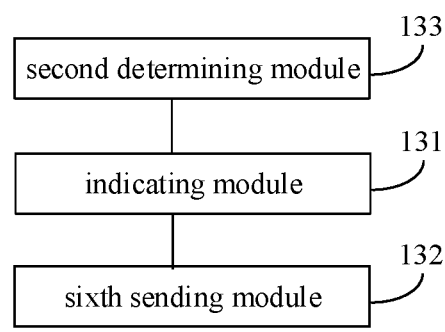
FIG. 14 is a block diagram of a device for saving power of UE according to an exemplary embodiment.

FIG. 14 is a block diagram of a device for saving power of UE according to an exemplary embodiment. As shown in FIG. 14, based on the embodiment shown in FIG. 13, according to an embodiment herein, the device may further include a second determining module, The second determining module 133 may be adapted to determining, based on a timed service reservation for the UE, whether the original DRX cycle of the UE is to be updated.

Figure 15:
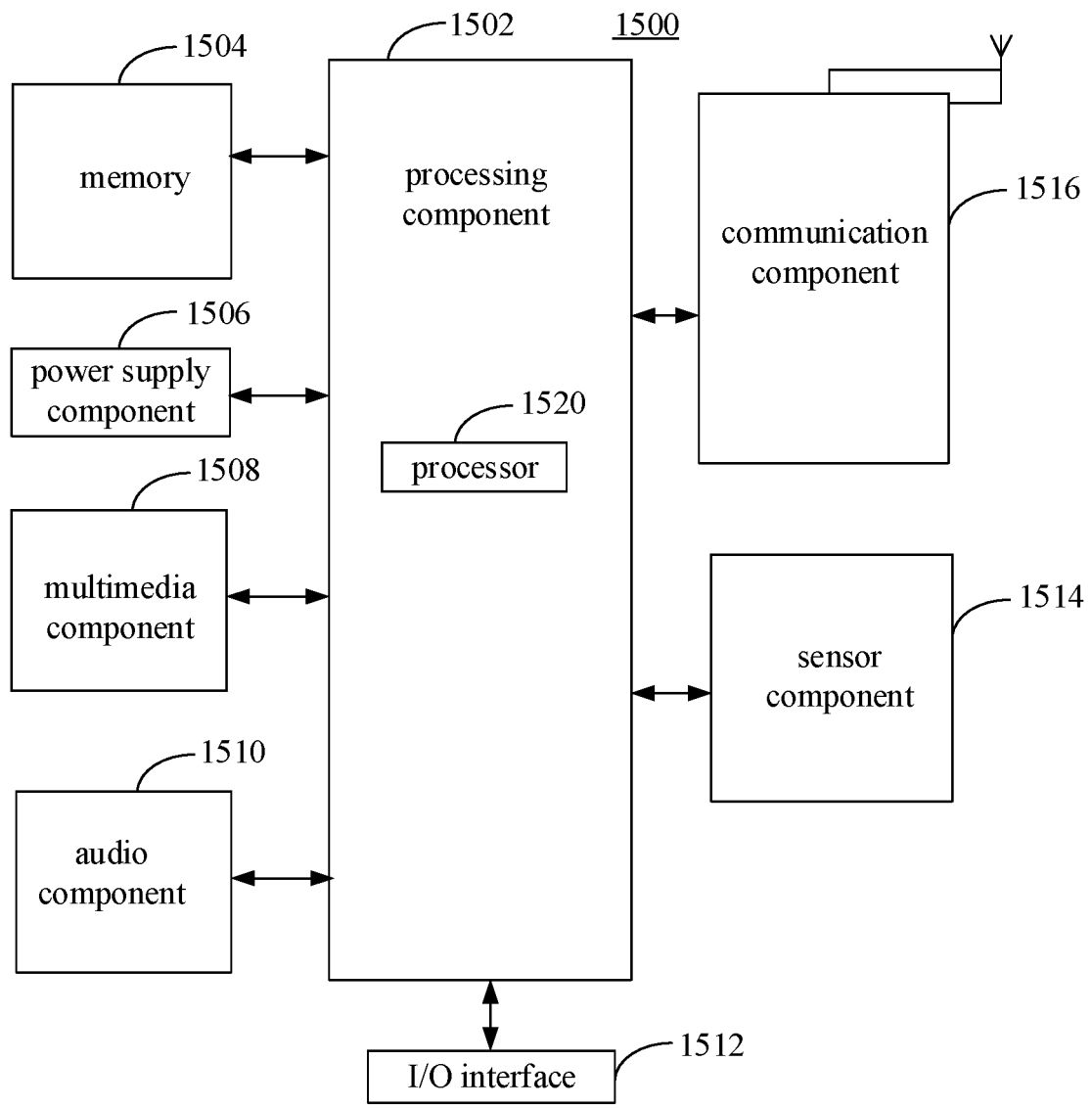
FIG. 15 is a block diagram of a device for saving power of UE according to an exemplary embodiment.

FIG. 15 is a block diagram of a device for saving power of UE according to an exemplary embodiment. For example, the device 1500 may be UE such as a mobile phone, a computer, digital broadcast UE, messaging equipment, a gaming console, tablet equipment, medical equipment, exercise equipment, a personal digital assistant, etc.

Referring to FIG. 15, the device 1500 may include at least one of a processing component 1502, memory 1504, a power supply component 1506, a multimedia component 1508, an audio component 1510, an Input/Output (I/O) interface 1512, a sensor component 1514, a communication component 1516, etc.

The processing component 1502 may generally control an overall operation of the device 1500, such as operations associated with display, a telephone call, data communication, a camera operation, a recording operation, etc. The processing component 1502 may include one or more processors 1520 to execute instructions so as to complete all or a part of an aforementioned method. In addition, the processing component 1502 may include one or more modules to facilitate interaction between the processing component 1502 and other components. For example, the processing component 1502 may include a multimedia portion to facilitate interaction between the multimedia component 1508 and the processing component 1502.

The memory 1504 may be adapted to storing various types of data to support the operation at the device 1500. Examples of such data may include instructions of any application or method adapted to operating on the device 1500, contact data, phonebook data, messages, pictures, videos, etc. The memory 1504 may be realized by any type of transitory or non-transitory storage equipment or a combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, a magnetic disk, a compact disk, etc.

The power supply component 1506 may supply electric power to various components of the device 1500. The power supply component 1506 may include a power management system, one or more power sources, and other components related to generating, managing, and distributing electricity for the device 1500.

The multimedia component 1508 may include a screen that provides an output interface between the device 1500 and a user. The screen may include a Liquid Crystal Display (LCD), a Touch Panel (TP), etc. If the screen includes a TP, the screen may be realized as a touch screen to receive a signal input by a user. The TP may include one or more touch sensors for sensing touch, slide, and gestures on the TP. The one or more touch sensors not only may sense the boundary of a touch or slide move, but also detect the duration and pressure related to the touch or slide move. The multimedia component 1508 may include at least one of a front camera or a rear camera. When the device 1500 is in an operation mode such as a photographing mode or a video mode, at least one of the front camera or the rear camera may receive external multimedia data. Each of the front camera or the rear camera may be a fixed optical lens system or may have a focal length and be capable of optical zooming.

The audio component 1510 may be adapted to outputting and/or inputting an audio signal. For example, the audio component 1510 may include a microphone (MIC). When the device 1500 is in an operation mode such as a call mode, a recording mode, a voice recognition mode, etc., the MIC may be adapted to receiving an external audio signal. The received audio signal may be further stored in the memory 1504 or may be sent via the communication component 1516. The audio component 1510 may further include a loudspeaker adapted to outputting the audio signal.

The I/O interface 1512 may provide an interface between the processing component 1502 and a peripheral interface portion. Such a peripheral interface portion may be a keypad, a click wheel, a button, etc. Such a button may include but is not limited to at least one of a homepage button, a volume button, a start button, or a lock button.

The sensor component 1514 may include one or more sensors for assessing various states of the device 1500. For example, the sensor component 1514 may detect an on/off state of the device 1500 and relative positioning of components such as the display and the keypad of the device 1500. The sensor component 1514 may further detect a change in the position of the device 1500 or of a component of the device 1500, whether there is contact between the device 1500 and a user, the orientation or acceleration/deceleration of the device 1500, a change in the temperature of the device 1500, etc. The sensor component 1514 may include a proximity sensor adapted to detecting existence of a nearby object without physical contact. The sensor component 1514 may further include an optical sensor such as a Complementary Metal-Oxide-Semiconductor (CMOS) or a Charge-Coupled-Device (CCD) image sensor used in an imaging application. The sensor component 1514 may further include an acceleration sensor, a gyroscope sensor, a magnetic sensor, a pressure sensor, a temperature sensor, etc.

The communication component 1516 may be adapted to facilitating wired or wireless communication between the device 1500 and other equipment. The device 1500 may access a wireless network based on a communication standard such as Wi-Fi, 2G, 3G . . . , or a combination thereof. The communication component 1516 may broadcast related information or receive a broadcast signal from an external broadcast management system via a broadcast channel. The communication component 1516 may include a Near Field Communication (NFC) module for short-range communication. For example, the NFC module may be based on technology such as Radio Frequency Identification (RFID), Infrared Data Association (IrDA), Ultra-Wideband (UWB) technology, Bluetooth (BT), etc.

The device 1500 may be realized by one or more electronic components such as an Application Specific Integrated Circuit (ASIC), a Digital Signal Processor (DSP), a Digital Signal Processing Device (DSPD), a Programmable Logic Device (PLD), a Field Programmable Gate Array (FPGA), a controller, a microcontroller, a microprocessor, etc., to implement the method.

A non-transitory computer-readable storage medium including instructions, such as memory 1504 including instructions, may be provided. The instructions may be executed by the processor 1520 of the device 1500 to implement an aforementioned method according to a first aspect herein and/or an aforementioned method according to a second aspect herein.

For example, the non-transitory computer-readable storage medium may be Read-Only Memory (ROM), Random Access Memory (RAM), Compact Disc Read-Only Memory (CD-ROM), a magnetic tape, a floppy disk, optical data storage equipment, etc.

Figure 16:
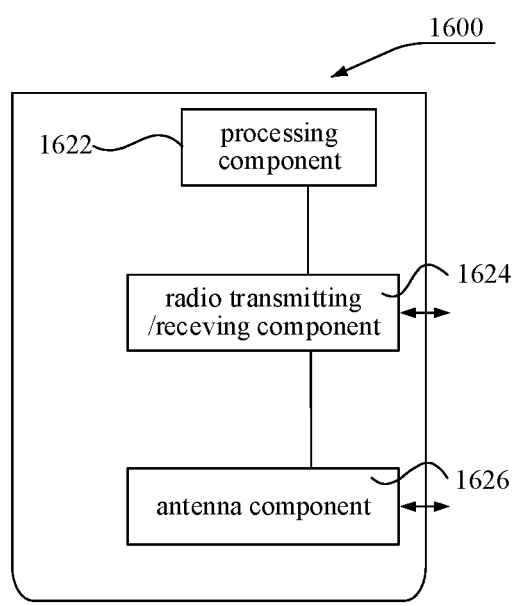
FIG. 16 is a block diagram of a device for saving power of UE according to an exemplary embodiment.

FIG. 16 is a block diagram of a device for data sending according to an exemplary embodiment. The device 1600 may be provided as a base station. Referring to FIG. 16, the device 1600 may include a processing component 1622, a radio transmitting/receiving component 1624, an antenna component 1626, and a signal processing part dedicated to a radio interface. The processing component 1622 may further include one or more processors.

A processor of the processing component 1622 may be adapted to implementing the method for saving power of UE according to a second aspect herein.

According to an embodiment herein, a non-transitory computer-readable storage medium including instructions may be provided. The instructions may be executed by the processing component 1622 of the device 1600 to implement an aforementioned method according to a third aspect and/or a fourth aspect herein. For example, the non-transitory computer-readable storage medium may be Read-Only Memory (ROM), Random Access Memory (RAM), Compact Disc Read-Only Memory (CD-ROM), a magnetic tape, a floppy disk, optical data storage equipment, etc.

Other implementations of the subject disclosure will be apparent to a person having ordinary skill in the art that has considered the specification and or practiced the subject disclosure. The subject disclosure is intended to cover any variation, use, or adaptation of the subject disclosure following the general principles of the subject disclosure and including such departures from the subject disclosure as come within common knowledge or customary practice in the art. The specification and the embodiments are intended to be exemplary only, with a true scope and spirit of the subject disclosure being indicated by the appended claims.

Note that the subject disclosure is not limited to the exact construction that has been described above and illustrated in the accompanying drawings, and that various modifications and changes can be made to the subject disclosure without departing from the scope of the subject disclosure. It is intended that the scope of the subject disclosure is limited only by the appended claims.

The invention claimed is:

1. A method for saving power of User Equipment (UE), applying to UE, the method comprising:
    determining second signaling based on first signaling, the second signaling being Radio Resource Control (RRC) connection request signaling, the second signaling comprising a signaling element, the signaling element being a cause value indicating that a request for establishing an RRC connection is sent for Discontinuous Reception (DRX) cycle update; and
    sending the second signaling,
    wherein the second signaling further comprises information indicating a desired DRX cycle and an effective term during which an updated DRX cycle is in effect, and the method further comprises: receiving third signaling sent by a base station based on the second signaling, the third signaling comprising the updated DRX cycle, or
    wherein the method further comprises: receiving fourth signaling sent by the base station based on the second signaling, the fourth signaling being RRC connection establishment signaling; sending fifth signaling to the base station, the fifth signaling comprising the information indicating the desired DRX cycle and the effective term during which the updated DRX cycle is in effect; and receiving sixth signaling sent by the base station based on the fifth signaling, the sixth signaling comprising the updated DRX cycle.

2. The method of claim 1, further comprising: before determining the second signaling based on the first signaling,
    receiving a trigger of DRX cycle update sent by a user.

3. A communication system implementing the method of claim 1, comprising the UE, wherein the UE is configured to request the base station to change a DRX cycle through the RRC connection request signaling.

4. The communication system of claim 3, further comprising the base station, wherein the base station is configured to set the DRX cycle for the UE based on the request of the UE, thereby optimizing power saving performance of the UE.

5. The communication system of claim 4, wherein the base station is further configured to take initiative to update the DRX cycle of UE through a paging message and new paging Downlink Control Information (DCI) based on a timed reservation for the UE, thereby optimizing the power saving performance of the UE.

6. The communication system of claim 5, wherein the base station is further configured to:
    receive the second signaling sent by UE; and
    send response signaling based on the second signaling.

7. The communication system of claim 6,
    wherein the sending the response signaling based on the second signaling comprises: sending the third signaling.

8. The communication system of claim 7,
    wherein the sending the response signaling based on the second signaling comprises: sending the fourth signaling to the UE,
    wherein the base station is further configured to:
    receive the fifth signaling sent by the UE after the RRC connection is established;
    update, based on the fifth signaling, an original DRX cycle of the UE with the updated DRX cycle;
    send the sixth signaling to the UE;
    in response to determining that a time elapse since the DRX cycle update has reached the effective term, restore the original DRX cycle of the UE; and
    send seventh signaling to the UE, the seventh signaling comprising the original DRX cycle.

9. A method for saving power of User Equipment (UE), applying to a base station, the method comprising:
    receiving second signaling sent by UE, the second signaling being Radio Resource Control (RRC) connection request signaling, the second signaling comprising a signaling element, the signaling element being a cause value indicating that a request for establishing an RRC connection is sent for Discontinuous Reception (DRX) cycle update; and
    sending response signaling based on the second signaling,
    wherein the second signaling comprises information indicating a desired DRX cycle and an effective term during which an updated DRX cycle is in effect,
    wherein the sending the response signaling based on the second signaling comprises: sending third signaling, the third signaling comprising the updated DRX cycle, or
    wherein the sending the response signaling based on the second signaling comprises: sending fourth signaling to the UE, the fourth signaling being RRC connection establishment signaling, wherein the method further comprises: receiving fifth signaling sent by the UE after the RRC connection is established, the fifth signaling comprising the information indicating the desired DRX cycle and the effective term during which the updated DRX cycle is in effect; updating, based on the fifth signaling, an original DRX cycle of the UE with the updated DRX cycle; and sending sixth signaling to the UE, the sixth signaling comprising the updated DRX cycle.

10. The method of claim 9, further comprising:
in response to determining that a time elapse since the DRX cycle update has reached the effective term, restoring the original DRX cycle of the UE; and
sending seventh signaling to the UE, the seventh signaling comprising the original DRX cycle.

11. A method for saving power of User Equipment (UE), applying to a base station, the method comprising:
in response to determining that an original Discontinuous Reception (DRX) cycle of UE is to be updated, indicating, on a Physical Downlink Control CHannel (PDCCH), that there is a paging message with a cause value for DRX cycle update; and
sending, on a Physical Downlink Shared CHannel (PDSCH), a data block comprising the paging message, the paging message comprising an updated DRX cycle.

12. The method of claim 11, further comprising:
determining, based on a timed service reservation for the UE, whether the original DRX cycle of the UE is to be updated.

* * * * *